United States Patent
Bateman et al.

(10) Patent No.: US 8,074,208 B2
(45) Date of Patent: Dec. 6, 2011

(54) SYSTEM AND METHOD FOR GENERATING SAFE AND EFFICIENT COMPONENT RELATIONSHIPS IN WIRELESS APPLICATIONS

(75) Inventors: Cameron Bateman, San Francisco, CA (US); Bryan R. Goring, Milton (CA); Michael Shenfield, Richmond Hill (CA)

(73) Assignee: Research In Motion Limited, Waterloo, Ontario (CA)

( * ) Notice: Subject to any disclaimer, the term of this patent is extended or adjusted under 35 U.S.C. 154(b) by 1615 days.

(21) Appl. No.: 11/379,158

(22) Filed: Apr. 18, 2006

(65) Prior Publication Data

US 2006/0253571 A1    Nov. 9, 2006

Related U.S. Application Data

(60) Provisional application No. 60/672,008, filed on Apr. 18, 2005.

(51) Int. Cl.
  *G06F 9/44* (2006.01)
(52) U.S. Cl. .................. 717/133; 717/127; 717/132
(58) Field of Classification Search .................. None
  See application file for complete search history.

(56) References Cited

U.S. PATENT DOCUMENTS

| | | | | |
|---|---|---|---|---|
| 5,481,717 | A * | 1/1996 | Gaboury | 717/126 |
| 5,963,739 | A * | 10/1999 | Homeier | 717/126 |
| 6,633,863 | B1 * | 10/2003 | Sørensen Møller et al. | 1/1 |
| 6,691,207 | B2 * | 2/2004 | Litt et al. | 711/108 |
| 6,918,108 | B2 * | 7/2005 | Rajaram | 717/126 |
| 7,006,960 | B2 * | 2/2006 | Schaumont et al. | 703/15 |
| 7,117,395 | B2 * | 10/2006 | Opaterny | 714/39 |
| 7,548,935 | B2 * | 6/2009 | Pecherer | 1/1 |
| 7,779,393 | B1 * | 8/2010 | Manovit et al. | 717/132 |
| 7,870,541 | B1 * | 1/2011 | Deshpande | 717/131 |
| 2002/0013779 | A1 * | 1/2002 | Sridhar | 707/4 |
| 2002/0013934 | A1 * | 1/2002 | Xie et al. | 716/4 |
| 2002/0083314 | A1 | 6/2002 | Uyttendaele et al. | |
| 2003/0066064 | A1 * | 4/2003 | Rajaram | 717/173 |
| 2003/0191942 | A1 * | 10/2003 | Sinha et al. | 713/181 |
| 2004/0083222 | A1 * | 4/2004 | Pecherer | 707/100 |
| 2004/0154009 | A1 * | 8/2004 | Reynaud | 717/155 |
| 2005/0015752 | A1 | 1/2005 | Alpern et al. | |
| 2005/0044531 | A1 * | 2/2005 | Chawla et al. | 717/122 |
| 2006/0248515 | A1 * | 11/2006 | Qadeer et al. | 717/127 |
| 2006/0253571 | A1 * | 11/2006 | Bateman et al. | 709/224 |
| 2007/0113059 | A1 * | 5/2007 | Tran | 712/241 |

OTHER PUBLICATIONS

Sreedhar, Vugranam C., Gao, Guag R., and Lee, Yong-Fong. Identifying Loops Using DJ Graphs, ACM Transactions on Programming Languages and Systems, vol. 18, No. 6 Nov. 1996, pp. 649-658.*
Amir Kamil "Discussion #13 Graph Algorithms" UC Berkeley 2003 <http://www.cs.berkeley.edu/~kamil/teaching/sp03/041403.pdf> all pages.*

(Continued)

*Primary Examiner* — Tuan Dam
*Assistant Examiner* — Samuel Hayim

(57) ABSTRACT

A method of detecting recursive instantiation loops in a wireless application. A data model digraph is constructed including a respective node for each data component in the wireless application, and a respective edge for each relationship between a pair of data components. The data model digraph is searched to identify any cycles. For each identified cycle, each data component that participates in the cycle is identified.

12 Claims, 6 Drawing Sheets

OTHER PUBLICATIONS

Journal of Computer and System Sciences 9; Computer Science Division, University of California; entitled "Testing Flow Graph Reducibility"; pp. 355-365, Jul. 3, 1974; R. Endre Tarjan.

Ural et al., "Modeling software for accurate data flow representation", ICSE '93 Proceedings of the 15th International Conference on Software Engineering, 1993, pp. 277-286.

* cited by examiner

SYSTEM AND METHOD FOR GENERATING SAFE AND EFFICIENT COMPONENT RELATIONSHIPS IN WIRELESS APPLICATIONS

CROSS-REFERENCE TO RELATED APPLICATIONS

The present application is based on and claims benefit under 35 U.S.C. §119(e) of Applicant's U.S. Patent Application No. 60/672,008 filed Apr. 18, 2005.

TECHNICAL FIELD

The present invention relates to wireless communications and in particular to a method and system for generating safe and efficient component relationships in wireless applications.

BACKGROUND OF THE INVENTION

The number and variety of wireless terminal devices, such as mobile telephones, personal computers and PDAs with wireless communication capabilities, self-service kiosks and two-way pagers are rapidly increasing. Software applications which run on these devices increase their utility. For example, a mobile phone may include an application which retrieves the weather for a range of cities, or a PDA may include an application that allows a user to shop for groceries. These software applications take advantage of wireless connectivity to a data network (such as the Internet) in order to provide timely and useful services to users.

Referring to FIG. 1, a network facilitating the use of software-driven wireless terminal devices generally comprises an Application Gateway (AG) 2 coupled between a wireless network 4 and a data network 6, such as for example, the internet; and one or more wireless terminal devices 8 coupled to the wireless network 4, and hosted by the AG 2.

The AG 2 generally operates to mediate message flows between the terminal devices 8 and data services 10 accessible through the data network in the manner described in Applicant's co-pending U.S. Patent Publications Nos. 2004/0215700 and 2004/0220998, the contents of both of which are incorporated herein by reference.

In general, the terminal devices 8 can be any of a wide variety of software-controlled wireless devices including, but not limited to, mobile telephones, personal computers and PDAs with wireless communication capabilities, self-service kiosks and two-way pagers. As is well known in the art, such devices generally comprise a microprocessor which operates under software control to provide the functionality of the terminal device 8.

As described in Applicant's co-pending U.S. Patent Publications Nos. 2004/0215700 and 2004/0220998, operation of the AG 2 enables a wireless application executing in a terminal device 8 to communicate with Web services 10 offered through the data network 6. This operation may, for example, including accessing HTML content and downloading files from back-end data sources (not shown) connected to the data network 6. In order to reduce device resource requirements, each wireless application provides User Interface (UI) functionality (for both display and user input) appropriate to the capabilities of the particular terminal device 8. At least a portion of the application logic is executed on the AG 2, so that signalling between the AG 2 and the terminal device 8 is limited to downloading application data for local storage and display on the terminal device 8, and uploading user inputs. The application logic executing on the AG 2 communicates with a Web service 10 or back-end data source (not shown) on the data network 6, in response to the user input received from the terminal device 8, to provide the functionality of the wireless application. This arrangement enables a user of the terminal device 8 to access and use the Web service 10, but with reduced signalling traffic to/from the terminal device 8 to thereby limit wireless network bandwidth and device resource requirements.

As will be appreciated, instantiation of data components of an application during runtime is governed by relationships between different components, called "inheritance" (or "prototyping") and "aggregation". These are also known in the art as "is-a" and "has-a" relationships, respectively. The former refers to one component A being a specialization of another component B. The latter refers to one component C having as part of it another component D. When either relationship exists, the instantiation of one component invokes the instantiation of another component. Component A cannot be instantiated until component B has. Component C cannot be instantiated until component D has.

A malicious programmer may try to define these relationships in such a way that infinite loops are created when instantiating components on the device. Such infinite loops may cause device lock-ups, application crashes and saturation of resources such as memory, so they are undesirable. Furthermore, a programmer may inadvertently and without malice create such relationships and unknowingly deploy equally undesirable wireless applications.

In practice, two main types of relationships should be avoided. The first is a "direct" recursive loop such as that illustrated in FIG. 2a. A direct recursive loop occurs when a set of data components are defined, and the aggregation relationships between these components set up a closed loop. The Example of FIG. 2a shows a recursive loop of three components. As shown in FIG. 2a, when data component A is instantiated, it will try to instantiate Data B. When Data B is instantiated, it will try to instantiate Data C. But when Data C is instantiated it will try to instantiate Data A. Thus an infinite recursive loop of component instantiations is set up, which will continue until all memory on the terminal device has been consumed.

In languages like Java and C++, the above-described recursive relationship can be created dynamically in the following manner:

```
class A
{
   B b=new B ( );
}
class B
{
   C c=new C ( );
}
class C
{
   A a=new A( );
}
```

With this situation, creating an instance of any of classes A, B or C (during runtime) will cause the application to loop recursively, creating ever-deeper nesting of objects a, b and c until the host computer's stack overflows or memory runs out. Conventional compilers and runtime systems provide no mechanisms that prevent the programmer from creating these kinds of recursive loops.

The second relationship type is more subtle. Because data components allow inheritance, it is possible to create a situation where a recursive loop is created indirectly. Such an "indirect" recursive loop is illustrated in FIG. 2b. In this case, when Data A is instantiated, it will try to instantiate Data B. However, Data B is linked to Data C by inheritance, so instantiation of Data B also instantiates Data C. But when Data C is instantiated, it will try to instantiate Data A, and the recursive loop is established. Here again, conventional compilers and runtime systems provide no mechanism to stop the programmer from creating these kinds of recursive loops.

Existing systems that allow initialization of data leave it to the programmer to avoid both of the above situations. However this arrangement is not acceptable on wireless devices, because a provider of wireless services may be held responsible for the behaviour of applications created by third-party application developers who are outside of the service provider's control.

Accordingly, methods and systems for enforcing safe component relationships in wireless applications remain highly desirable.

SUMMARY OF THE INVENTION

Accordingly, an object of the present invention is to provide methods and systems for generating safe component relationships in wireless applications.

This object is met by the features of the invention defined in the appended independent claims. Further optional features of the invention are defined in the appended dependent claims.

Thus, an aspect of the present invention provides a method of detecting recursive instantiation loops in a wireless application. A data model digraph is constructed including a respective node for each data component in the wireless application, and a respective edge for each relationship between a pair of data components. The data model digraph is searched to identify any cycles. For each identified cycle, each data component that participates in the cycle is identified.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

The present invention provides methods and systems for generating safe component relationships in wireless applications. A representative embodiment of the invention is described below, by way of example only.

As is well known in the art, application developers typically use an application development environment (ADE) to code, test, and debug application software. In accordance with the present invention, an ADE for developing wireless applications includes one or more components implementing an algorithm that can detect recursive loops in the instantiation of data components of a wireless application. In one embodiment, the algorithm is an improvement of the known "Depth First Search", which is targeted to this type of problem.

To facilitate description of the present embodiment, it is useful to establish the following terminology.

A "graph" is a group of "nodes" and "edges". Each edge defines a connection between two nodes. A path between two nodes A and B is a sequence of one or more edges that connect A to B. A path may traverse any number of nodes between the two nodes A and B. If there are two distinct paths between a pair of nodes A and B, the graph is said to have a "cycle".

A "digraph" is a "directed" graph in which each edge has a direction; such edges are also known in the art as "directed edges." Thus, for example, a node A may have an edge that connects it to node B, but node B may not have an edge that connects it back to node A. If there is an edge e from A to B then we say that A is the "source node" and B is the "destination node".

A "DataModel" can be defined as a set D of n data components of a wireless application. Each data component, di, ($1 \leq i \leq n$) has a set of fields F(di). Each field has a type, which may be either simple or complex. For any given data component di, let F'(di) represent the subset of fields of a type defined in D. This means that each field within F'(di) is of a type which is itself a data component. With this arrangement, F'(di) is the set of fields of the data component di that are "related to" other data components. In other words, F'(di) identifies the set of data components that are linked to the data component di via either explicit instantiation or inheritance.

Figure 1:
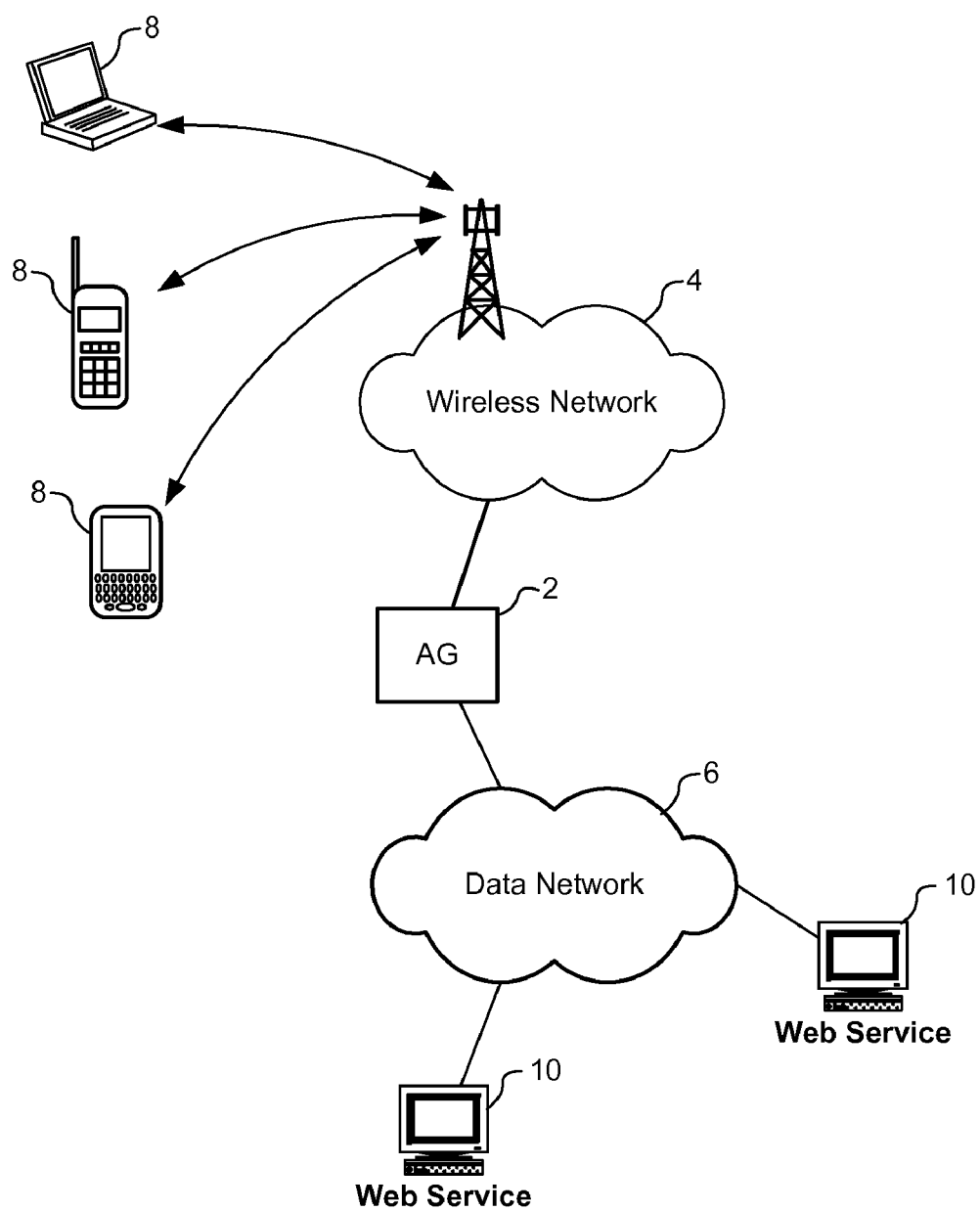
FIG. 1 is a block diagram schematically illustrating a network in which the present invention may be deployed.
Figure 2A:
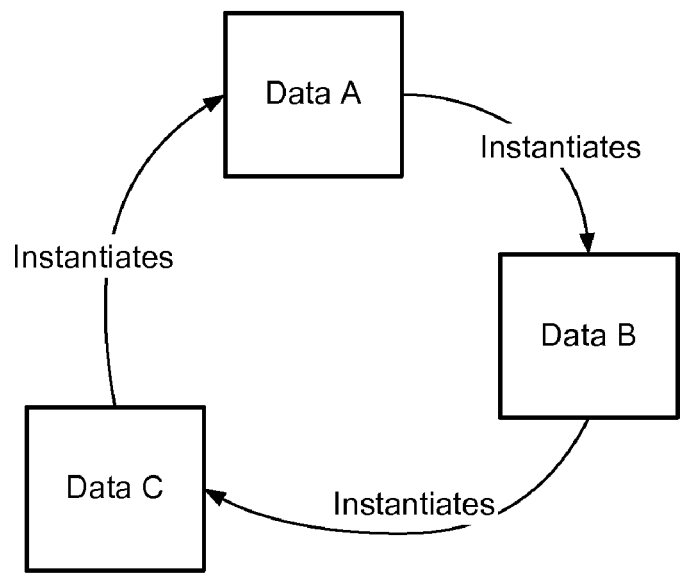
FIGS. 2a and 2b schematically illustrate respective types of recursive relationships.
Figure 2B:
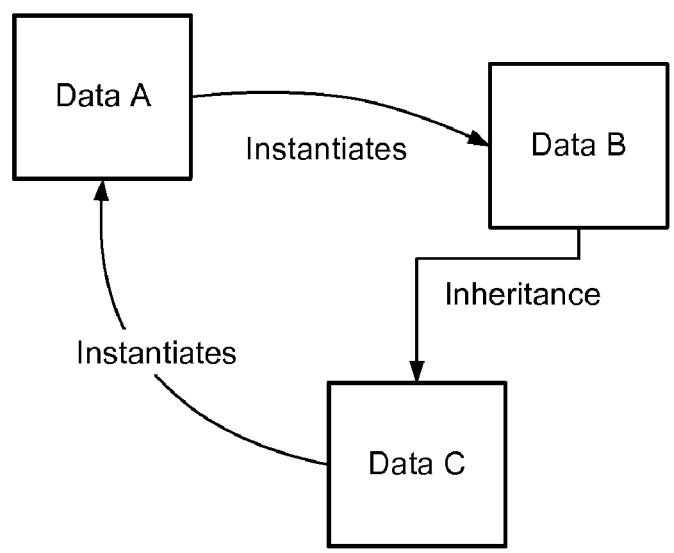
Figure 3:
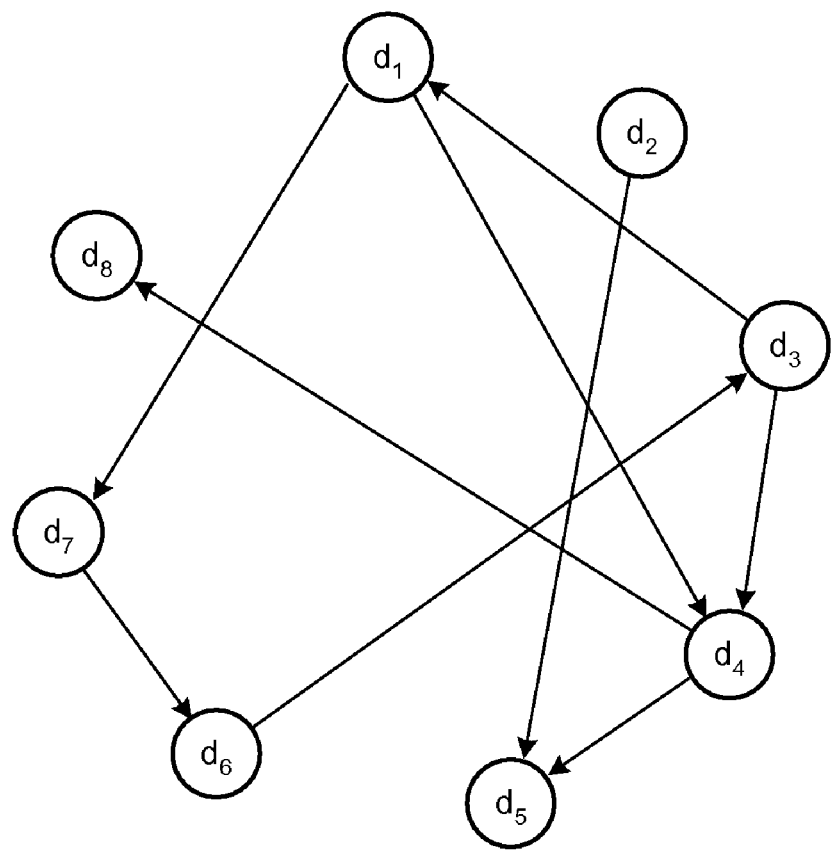
FIG. 3 schematically illustrates a possible data model digraph in accordance with a representative embodiment of the present invention.

Based on the foregoing, a "DataModelDigraph" can be defined as a digraph of a data model, in which each node corresponds to a data component di; and each edge with source node di corresponds to a link defined in the set F'(di). Thus, each node in a DataModelDigraph represents a data component, and each edge is a field of a data component which is also a data component. As such, each edge represents a relationship (either via instantiation or inheritance) between a pair of data components. By way of example, FIG. 3 shows a possible DataModelDigraph comprising eight nodes ($d_1$-$d_8$), and associated edges. Inspection of FIG. 3 shows that a cycle exists, in which nodes $d_1$, $d_7$, $d_6$ and $d_3$ are participants.

In general, recursive instantiation loops within a wireless application can be detected by a process in which a data model digraph is constructed for the application, in which each data component is represented by a respective node, and each relationship (via either instantiation or inheritance) between a pair of data components is represented by a respective edge between the corresponding nodes. The data model digraph is then systematically searched to identify any cycles. Each cycle is then analyzed to detect each node (data component) that participates in the cycle. In a representative embodiment, each of these three steps can be accomplished using the algorithm described below:

Step 1: Constructing a DataModelDigraph from a DataModel

Figure 4A:
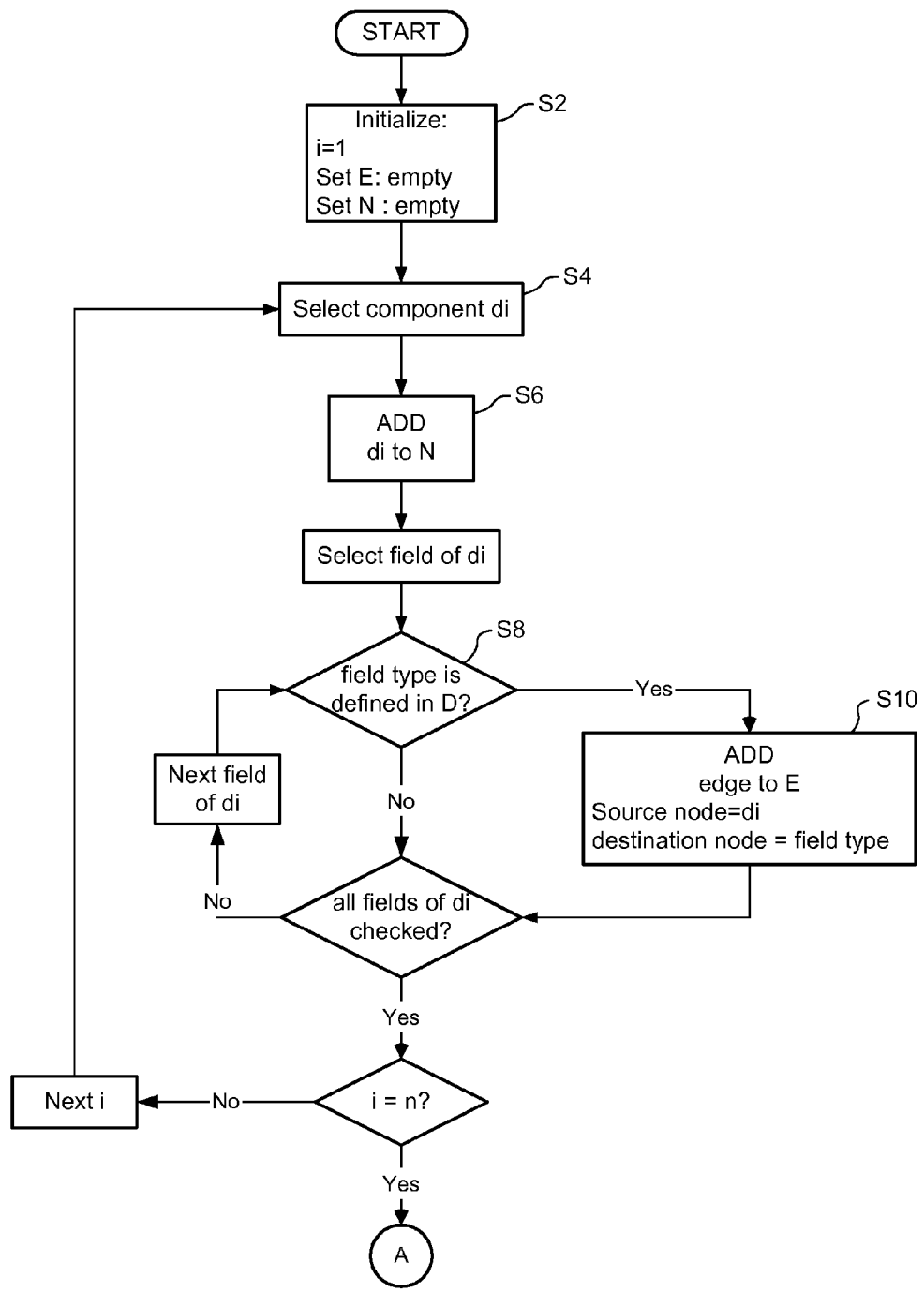
FIGS. 4a and 4b are flowcharts illustrating principal steps in a method of identifying cycles in accordance with a representative embodiment of the present invention.

A Data Model can be constructed by analysing the source code of an application to identify the set D of data components di ($1 \leq i \leq n$) that are defined in the application, and, for each data component di, its respective set of fields F(di). Once the data model has been constructed, the corresponding data model digraph can be generated using process outlined in FIG. 4a. Thus, a pair of sets, N and E, are initialized as empty sets (at step S2). Then, a first component di is selected (at S4) and added to N (at S6). Then, each of its fields is checked (at S8) to determine if it is of a type defined in D. If it is, then a corresponding edge is added (at S10) to the set E, with information identifying the source node as the component di and the destination node being the field type. This process is repeated for each component di defined in D.

Following execution of the above process, the set N will contain each of the nodes of the Data Model Digraph, and E will contain its edges. Together, sets N and E constitute the Data Model Digraph.

Step 2: Detecting cycles

Detection of cycles within the Data Model Digraph generally involves systematically searching the sets N and E to identify closed loops of edges. In a representative embodiment, this can be accomplished using the methods illustrated in FIGS. 4b and 5. For programming convenience, this method employs a pair of last-in first-out (LIFO) data structures (also known in the art as "stacks") "NodesVisited" and "PathStack", with operations PUSH (add one) and POP (remove the most recently PUSHed one).

Figure 4B:
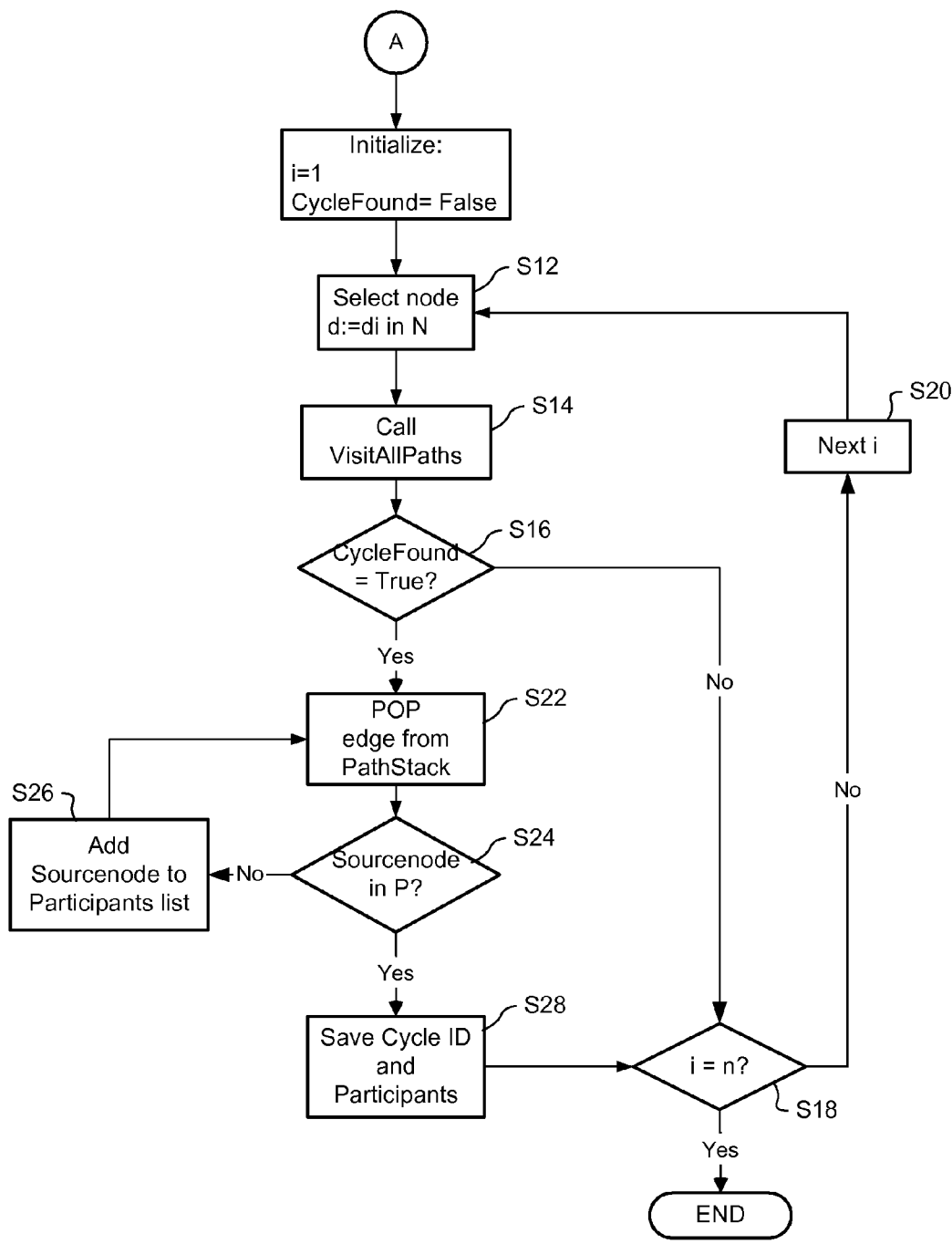

Referring to FIG. 4b, a first node d is selected (at S12) from the set N, and a function call to a "VisitAllPaths" function is made (at S14) using the node d, and the LIFOs NodesVisited and PathStack as parameters. As will be described in greater detail below, this function returns a value of "CycleFound=true" if a cycle involving the node d is found, and a value of "CycleFound=false" otherwise. Accordingly, upon return of the "VisitAllPaths" function, the returned value CycleFound is checked (at S16). If "CycleFound=false", meaning that a cycle has not been found, then if any nodes remain in the set N which have not been checked (S18), the next node d is selected (steps S20 and S12) from the set N, and tested in the above manner.

On the other hand, if the "VisitAllPaths" function returns a value of "CycleFound=true", then the LIFO PathStack will contain all of the edges that define the cycle. In fact, the LIFO PathStack may contain more edges than actually participate in the cycle since the cycle may not have become part of the path until some (unknown) number of nodes had been explored. However the top-most edge in PathStack will be the last edge of the cycle. Accordingly, all of the edges that participate in the cycle can be isolated by POPing each edge from the PathStack (S22); checking to determine if the source node of that edge has already been added to the list of participants P (S24), and, if it has not, adding the edge's source node to the participants list P (at S26). When it is found (at S24) that the source node of the POPed edge is already in the participants list P, then it is determined that all of the participants in the cycle have been isolated, and information regarding the cycle (e.g. a cycleID and the list of participants P) can be saved (at S28) for later analysis. If any nodes remain in the set N which have not been checked (S18), the next node d is selected from the set N (steps S20 and S12), and tested in the above manner.

Figure 5:
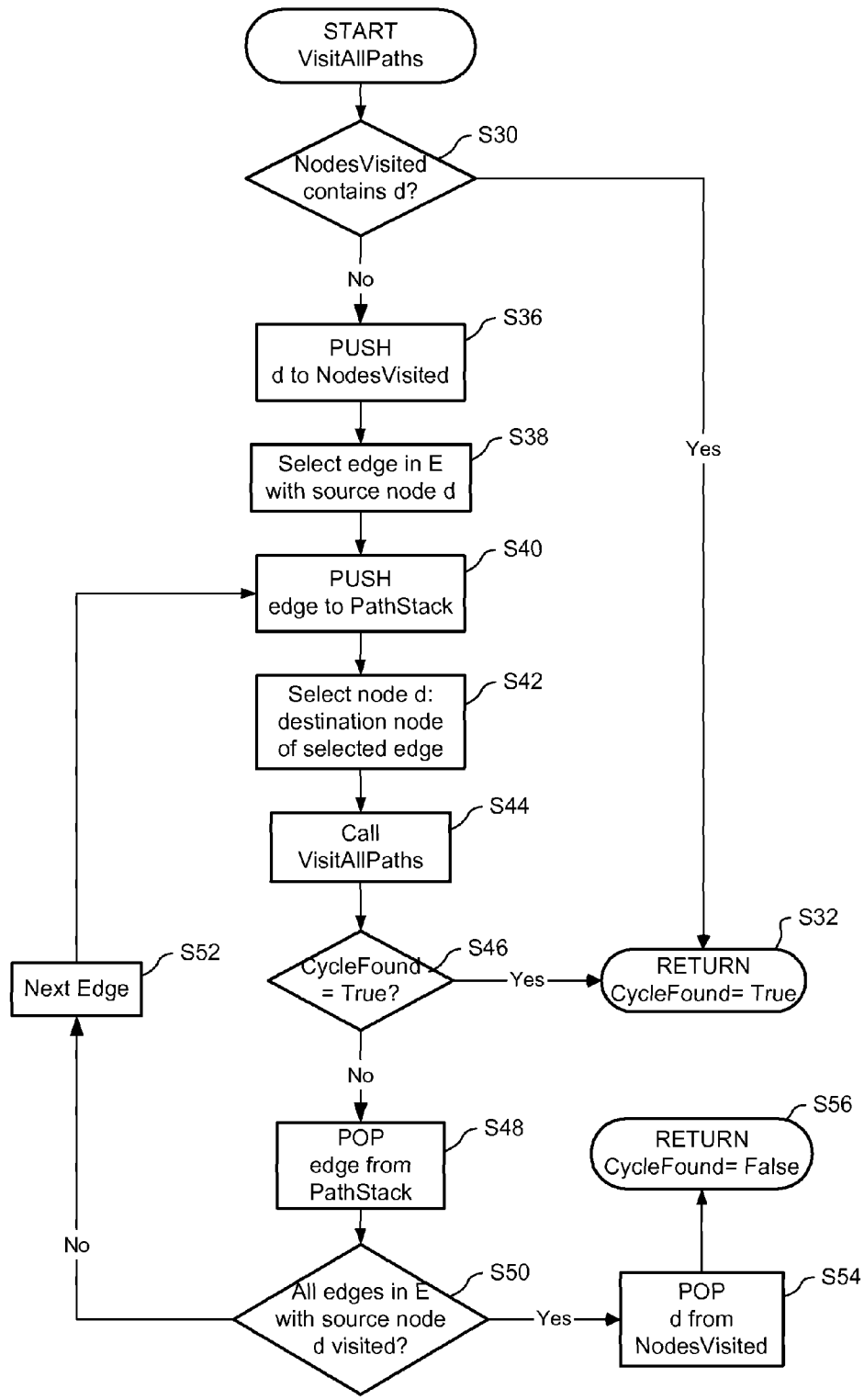
FIG. 5 is a flowchart illustrating principal steps in a representative VisitAllPaths function called by the method of FIGS. 4a and 4b.

As described above, detection of a cycle is accomplished by way of a function call to the "VisitAllPaths" function. A representative "VisitAllPaths" function is illustrated in FIG. 5, and described below.

Thus, at a first step (S30), the node d (passed as a parameter) is checked to 5 determine if it is already in the LIFO NodesVisited. If it is, then the function returns a CycleFound value of "true" (step S32). Otherwise, the node d is pushed to NodesVisited (S36), and a first edge with source node d selected from the set E of the Data Model Digraph (S38).

The selected edge is PUSHed to PathStack (S40), and the edge's destination node selected (S42) is used as a parameter of a call to the "VisitAllPaths" function (S44). As will be appreciated, this sets up recursive calls to the "VisitAllPaths" function, which enables cycles of any number of edges to be identified, thereby ensuring that any cycles in the Data Model Digraph will be found, regardless of their length.

Upon return of the "VisitAllPaths" function (S44), the value of CycleFound is checked (at S46). If "CycleFound=true", then the function returns "CycleFound=true" (at S32). Because of the recursive nature of the function, this step has the effect of unwinding any nested function calls to "VisitAllPaths". If, on the other hand, the returned value of CycleFound is "false", then the edge is not part of a cycle. Accordingly, the edge is POPed from the PathStack (at S48). If there are any other edges with source node d which have not yet been checked (S50), a next edge is selected (at S52) and processed as described above starting at step S40. If it is determined (at S50) that all of the edges with source node d have been checked, then the node d can be POPed from the LIFO NodesVisited (at S54), and the function returns "CycleFound=false" (at S56).

Once each cycle has been detected and the respective set of participants identified for each cycle, the application development environment (ADE) can make this information available to the application developer. As a result, the application developer is made aware of a potentially deleterious operation state of the application, and can take appropriate steps to avoid that issue (e.g. by revising one or more data components to "break" any cycles). The ADE may also provide one or more utilities or wizards to assist the application developer in the task of eliminating cycles from the application.

In addition, a service provider of a wireless network can refuse to deploy a wireless application until the application developer demonstrates (e.g. by use of the above-described methods) that there are no unresolved cycles within the application. For example, when the application developer decides to release a version of an application for deployment on the network, the ADE can be used to test the "release" version as described above to verify that there are no cycles. Upon successful verification of the application, the ADE may automatically generate a certificate which indicates that the "release" version of the application is safe. In order to prevent fraud by the application developer, information in the certificate identifying the release version may be may be encrypted or hashed using methods known in the art. The certificate can then be sent to the network service provider, which then permits deployment of the release version of the application on the network.

The embodiment(s) of the invention described above is(are) intended to be representative only. The scope of the invention is therefore intended to be limited solely by the scope of the appended claims.

We claim:

1. A method of detecting recursive instantiation loops in a wireless application, the method comprising steps of:

constructing, in an analysis step separate from application execution, a digraph including a respective node for each data component in the wireless application, and a respective edge for each relationship between a pair of data components, wherein the wireless application comprises application logic written in one or more imperative programming languages and wherein each of said data components is at least one of a data structure or object implemented in at least one of said imperative programming languages;

searching the digraph to identify any cycles; and for each identified cycle, identifying each data component that participates in the cycle, wherein the step of searching the digraph comprises a step of recursively following a path of successive edges and, if an edge is found for which the destination node is a node that is already part of the path, asserting that a cycle has been found, and wherein the step of recursively following a path of successive edges comprises:

maintaining a stack of nodes visited;

pushing a node on to the stack of nodes visited when said node is visited; and popping said node from the stack of nodes visited when all outgoing edges from said node have been followed, popping said node from the stack of nodes visited when all outgoing edges from said node have been followed, wherein determining whether a destination node is already part of the path comprises checking if the stack of nodes visited contains said destination node.

2. A method as claimed in claim 1, wherein the step of constructing a digraph comprising steps of:

populating a Node set N with information identifying each data component of the wireless application; and populating an Edge set E with information identifying, for each data component in N, each field of the data component that has a field type that is itself a data component of the wireless application.

3. A method as claimed in claim 2, wherein each field identified in the Edge set E is an edge having a source node corresponding to the data component and a destination node corresponding to the field type.

4. A method as claimed in claim 3, wherein the step of recursively following a path of successive edges further comprises:

maintaining a stack of edges followed;

before the destination node of an edge is visited, pushing said edge on to the stack of edges followed; and after the destination node of said edge has been visited, popping said edge from the stack of edges followed;

wherein the stack of edges followed is used to isolate the edges that participate in a cycle if a cycle is found.

5. A method of qualifying a wireless application for deployment in a network, the method comprising steps of:

constructing, in an analysis step separate from application execution, a digraph including a respective node for each data component in the wireless application, and a respective edge for each relationship between a pair of data components, wherein the wireless application comprises application logic written in one or more imperative programming languages and wherein each of said data components is at least one of a data structure or object implemented in at least one of said imperative programming languages;

searching the digraph to identify any cycles; and if a cycle is found, disqualifying the wireless application for deployment, and otherwise qualifying the wireless application for deployment on the network, wherein the step of searching the digraph comprises a step of recursively following a path of successive edges and, if an edge is found for which the destination node is a node that is already part of the path, asserting that a cycle has been found, and wherein the step of recursively following a path of successive edges comprises:

maintaining a stack of nodes visited;

pushing a node on to the stack of nodes visited when said node is visited; and popping said node from the stack of nodes visited when all outgoing edges from said node have been followed, wherein determining whether a destination node is already part of the path comprises checking if the stack of nodes visited contains said destination node.

6. A method as claimed in claim 5, wherein the step of constructing a digraph comprising steps of:

populating a Node set N with information identifying each data component of the wireless application; and populating an Edge set E with information identifying, for each data component in N, each field of the data component that has a field type that is itself a data component of the wireless application.

7. A method as claimed in claim 6, wherein each field identified in the Edge set E is an edge having a source node corresponding to the data component and a destination node corresponding to the field type.

8. A method as claimed in claim 5, further comprising, if no cycles are found in the application, a step of generating a certificate indicating that the application does not comprise recursive instantiation loops.

9. A method as claimed in claim 8, wherein the certificate includes information uniquely identifying the application.

10. A method as claimed in claim 9, wherein the information is stored in the certificate in an encrypted or hashed form, wherein said encrypted or hashed form indicates in a cryptographically secure manner that the uniquely identified application does not comprise recursive instantiation loops.

11. A method as claimed in claim 8, further comprising a step of forwarding the certificate to a network service provider of the network.

12. A method as claimed in claim 7, wherein the step of recursively following a path of successive edges further comprises:

maintaining a stack of edges followed;

before the destination node of an edge is visited, pushing said edge on to the stack of edges followed; and after the destination node of said edge has been visited, popping said edge from the stack of edges followed;

wherein the stack of edges followed is used to isolate the edges that participate in a cycle if a cycle is found.

* * * * *

UNITED STATES PATENT AND TRADEMARK OFFICE
CERTIFICATE OF CORRECTION

| | | |
|---|---|---|
| PATENT NO. | : 8,074,208 B2 | |
| APPLICATION NO. | : 11/379158 | |
| DATED | : December 6, 2011 | |
| INVENTOR(S) | : Cameron Bateman et al. | |

It is certified that error appears in the above-identified patent and that said Letters Patent is hereby corrected as shown below:

In column 7, claim 1, lines 15 and 16 should be deleted to remove the following duplicate text, which also appears on lines 13 and 14, "...popping said node from the stack of nodes visited when all outgoing edges from said node have been followed.".

Signed and Sealed this
Seventh Day of February, 2012

David J. Kappos
*Director of the United States Patent and Trademark Office*